(12) United States Patent  
Kuan et al.

(10) Patent No.: US 7,267,390 B2
(45) Date of Patent: Sep. 11, 2007

(54) VEHICLE DECKLID SYSTEM WITH PLANETARY GEAR

(75) Inventors: Chihping Kuan, Rochester Hills, MI (US); Joseph Benjamin Saxon, Cookeville, TN (US); Shelley Lynn Bolbrugge, Royal Oak, MI (US); Adam Kyle Cramton, Royal Oak, MI (US); Enrico Fin, Lake Orion, MI (US); Jack R. Roach, Florence, SC (US); Karim Dayoub, Royal Oak, MI (US); Walter Douglas Bauman, Wixom, MI (US)

(73) Assignee: AVM, Inc., Marion, SC (US)

( * ) Notice: Subject to any disclaimer, the term of this patent is extended or adjusted under 35 U.S.C. 154(b) by 211 days.

(21) Appl. No.: 11/110,391

(22) Filed: Apr. 20, 2005

(65) Prior Publication Data

US 2006/0237989 A1    Oct. 26, 2006

(51) Int. Cl.
B60J 5/10    (2006.01)

(52) U.S. Cl. .................. 296/146.8; 296/106; 296/76; 296/146.4; 49/334; 49/335

(58) Field of Classification Search ............ 296/146.4, 296/146.8, 106, 56, 76; 49/334, 335, 338, 49/341

See application file for complete search history.

(56) References Cited

U.S. PATENT DOCUMENTS

| 6,135,536 | A | 10/2000 | Ciavaglia |
| 6,425,205 | B2 | 7/2002 | Wygle |
| 6,520,557 | B2 | 2/2003 | Benthaus |
| 6,601,903 | B2 | 8/2003 | Nakagome |
| 6,955,390 | B2 * | 10/2005 | Rigorth et al. ........... 296/146.4 |

* cited by examiner

Primary Examiner—Joseph D. Pape
(74) Attorney, Agent, or Firm—Carlson, Gaskey & Olds

(57) ABSTRACT

A vehicle decklid system uses a planetary gear drive to move a decklid relative to a vehicle body. The planetary gear drive includes a rotatable gear that is disposed between two fixed gears. One fixed gear is rigidly mounted to the decklid and one fixed gear is rigidly mounted to the vehicle body. A rotating link connects centers of the rotatable gear and two fixed gears. The combination of the planetary gear drive and rotating link make it possible to provide powered complex, two-dimensional motion of the decklid requiring a four-bar linkage.

20 Claims, 3 Drawing Sheets

VEHICLE DECKLID SYSTEM WITH PLANETARY GEAR

BACKGROUND OF THE INVENTION

The present invention is directed to vehicle decklid control systems, and more particularly to a system that uses a planetary gear drive to move a vehicle decklid relative to a vehicle body.

Vehicle decklids for both trunks and hoods often use four-bar linkages to provide two-dimensional movement (i.e., rotational and translational movement) to the decklid. When designing a four-bar linkage, care must be taken to ensure that the four-bar linkage is strong enough to handle a decklid load. Often, the four-bar linkage requires additional reinforcement, which increases the overall cost of the four-bar linkage.

Further, four-bar linkages use two pin joints to mount the linkage to the vehicle body. These pin joints are also subjected to high load forces, causing the pin joints to wear quickly and have a short lifespan. Although it is possible to design pin joints with an increased lifespan by making the pin joints thicker or sturdier, increasing the strength of the pin joints also induces a great deal of friction in the four-bar linkage. The additional friction is detrimental to the overall performance of the decklid system.

There have been proposed systems that include gear trains driven by an electric motor to move the decklid between open and closed positions and potentially reduce the load applied to the four-bar linkages and the pin joints. However, these systems often require a gear reduction mechanism to drive the links directly, creating a large system package. Moreover, currently known decklid driving systems only provide rotational, circular movement of the decklid and not any translational movement, making it impossible to provide powered operation of the complex, two-dimensional movement provided by four-bar linkages.

There is a desire for a system that operates without a four-bar linkage, and which can provide powered operation of a vehicle decklid in a complex, non-circular motion.

SUMMARY OF THE INVENTION

The present invention is directed to a vehicle decklid that incorporates a planetary gear drive to move a decklid relative to a vehicle body between open and closed positions. In one embodiment, the planetary gear drive includes a rotatable sun gear that is in meshing engagement with first and second planetary gears. The first planetary gear is rigidly mounted to the decklid, and the second planetary gear is rigidly mounted to the vehicle body. A rotating link connects centers of the rotatable sun gear and first and second planetary gears together.

In one example, the planetary gear drive is driven by an electric motor mounted to the decklid. The motor includes a motor gear that drives the sun gear to move the decklid between the open and closed positions.

The combination of the planetary gear drive and the rotating link allows complex, two-dimensional motion of the decklid without requiring a four-bar linkage. A powered drive option is easily provided by incorporating an electric motor into the decklid. The electric motor drives the planetary gear drive to effectively and efficiently move the decklid between the open and closed positions, in addition to providing the capability to stop and hold the decklid at any position between the open and closed positions.

These and other features of the present invention can be best understood from the following specification and drawings, the following of which is a brief description.

DETAILED DESCRIPTION OF THE PREFERRED EMBODIMENT

Figure 1:
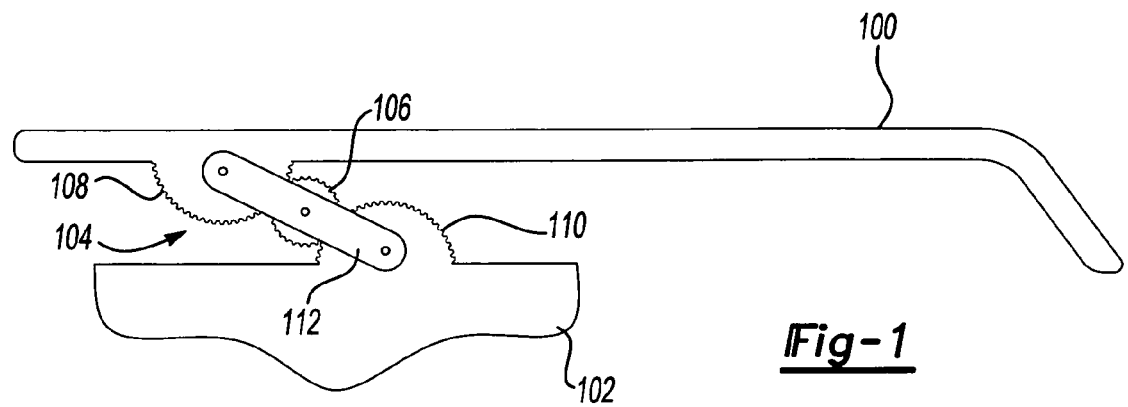
FIG. 1 is a representative side view of a decklid system according to one embodiment when a vehicle decklid is in a closed position.
Figure 2:
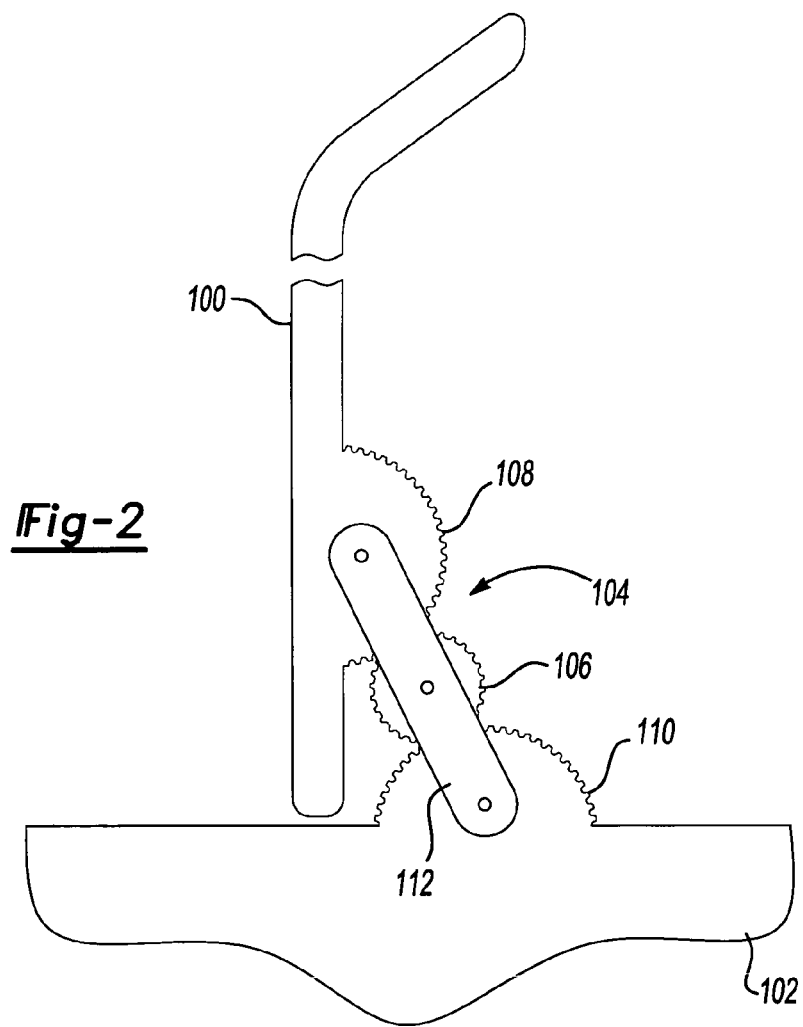
FIG. 2 is a representative side view of the system in FIG. 1 when the decklid is in an open position.

FIGS. 1 and 2 are representative diagrams of a decklid 100 connected to a vehicle body 102 via a planetary gear system 104 according to one embodiment of the invention. FIG. 1 shows the decklid 100 in a closed position, while FIG. 2 shows the decklid 100 in an open position. The planetary gear system 104 includes a central sun gear 106 disposed between first and second planetary gears 108, 110. Preferably, the first and second planetary gears 108, 110 are sector gears, however other gear types could also be used. Further, in the example shown, each sector gear comprises a semi-circle shape, however other sector gear configurations could also be used. The first 108 and second 110 gears are connected by a rotating link 112 that controls the motion of the sun gear 106 and the first 108 and second 110 planetary gears with respect to each other. The rotating link 112 may be a steel link similar to those used in conventional four-bar linkages. However, the planetary gear system 104 reduces the amount of load applied to the rotating link 112 and the joints in the planetary gear system 104, making it possible to manufacture the rotating link 112 from plastic without compromising performance, because the rotating link 112 is not required to support high loads. Using plastic for the rotating link 112 instead of steel also improves corrosion resistance of a decklid system. Further, the subject planetary gear system 104 and rotating link 112 reduces the overall number of mounting connections when compared to traditional four-bar linkage mounting configurations, which also reduces cost.

In the illustrated embodiment, the first planetary gear 108 is rigidly attached to the decklid 100 and the second sector gear 110 is rigidly attached to the vehicle body 102. The centers of the central sun gear 106 and the first 018 and second 110 planetary gears are then all held together by the rotating link 112. As discussed above, the planetary gear system 104 has only one vehicle mounting point, not two mounting points as is the case in conventional four-bar linkages. The single mounting point reduces the amount of friction in the decklid system, improving the performance of the decklid 100 as it is raised and lowered.

Figure 3:
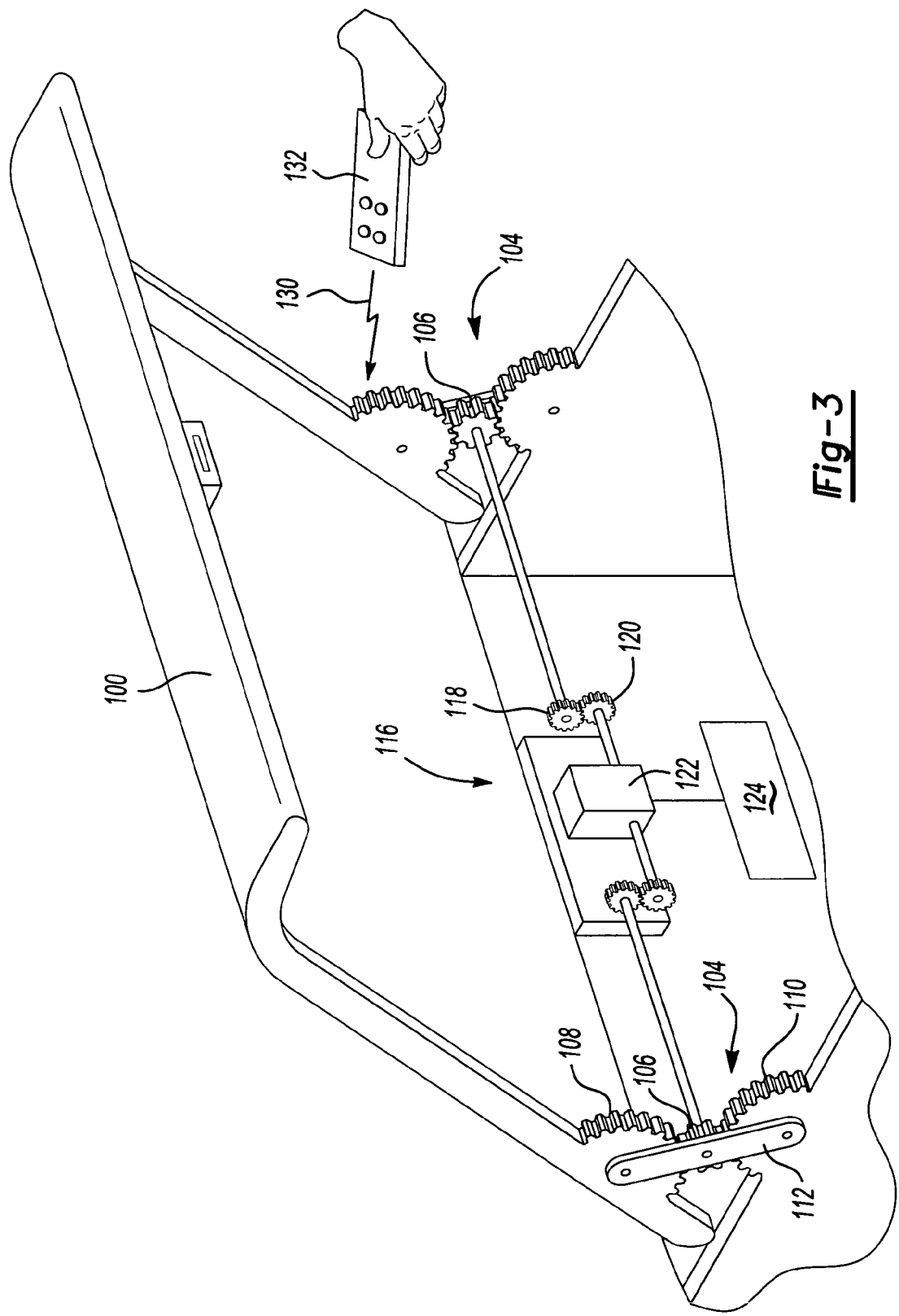
FIG. 3 is a front view of the system in FIG. 1 powered by an electric motor.

FIG. 3 is a representative diagram showing a control or drive mechanism 116 that is cooperatively coupled to planetary gear systems 104 on either side of the decklid 100. The planetary gear system 104 may be powered by any known drive mechanism 116. In the example shown in FIG. 3, the drive mechanism 116 comprises an electric motor 122.

The sun gear 106 may be extended to engage with a drive gear 118, which is driven by a motor gear 120 that is rotated directly by the electric motor 122. The motor 122 itself may be rigidly attached to the decklid 100. The motor 122 drives the motor gear 120, which drives the drive gear 118, causing the sun ear 106 to rotate. The specific way in which the various gears 106, 118, 120 are operatively coupled together does not matter as long as actuation of the motor 122 results in rotation of the sun gear 106, thereby driving the first 108 and second 110 planetary gears to move the decklid 100. The gear reduction effect inherent in the planetary gear system 104 reduces or eliminates the need for a separate gear reduction mechanism, making it possible to reduce the overall size of the decklid system.

The drive mechanism 116 may also include a controller 124 that, for example, controls operation of the motor 122. The controller 124 may be designed to be responsive to a remote user signal 130, such as a signal sent from the passenger compartment of the vehicle and/or a wireless signal transmitted via a key fob or other signal transmission device 132. This allows the decklid 100 to be opened and closed in a hands-free fashion. Moreover, the controller 124 may be designed to allow infinite adjustment for the decklid 100 at any position between the opened and closed positions, making it possible for the motor to stop the movement of the decklid 100 at any point and hold the decklid 100 in place as needed. This may be useful if, for example, the user wishes to hold the decklid 100 in a partially opened position to shield trunk contents from inclement weather.

Figure 4:
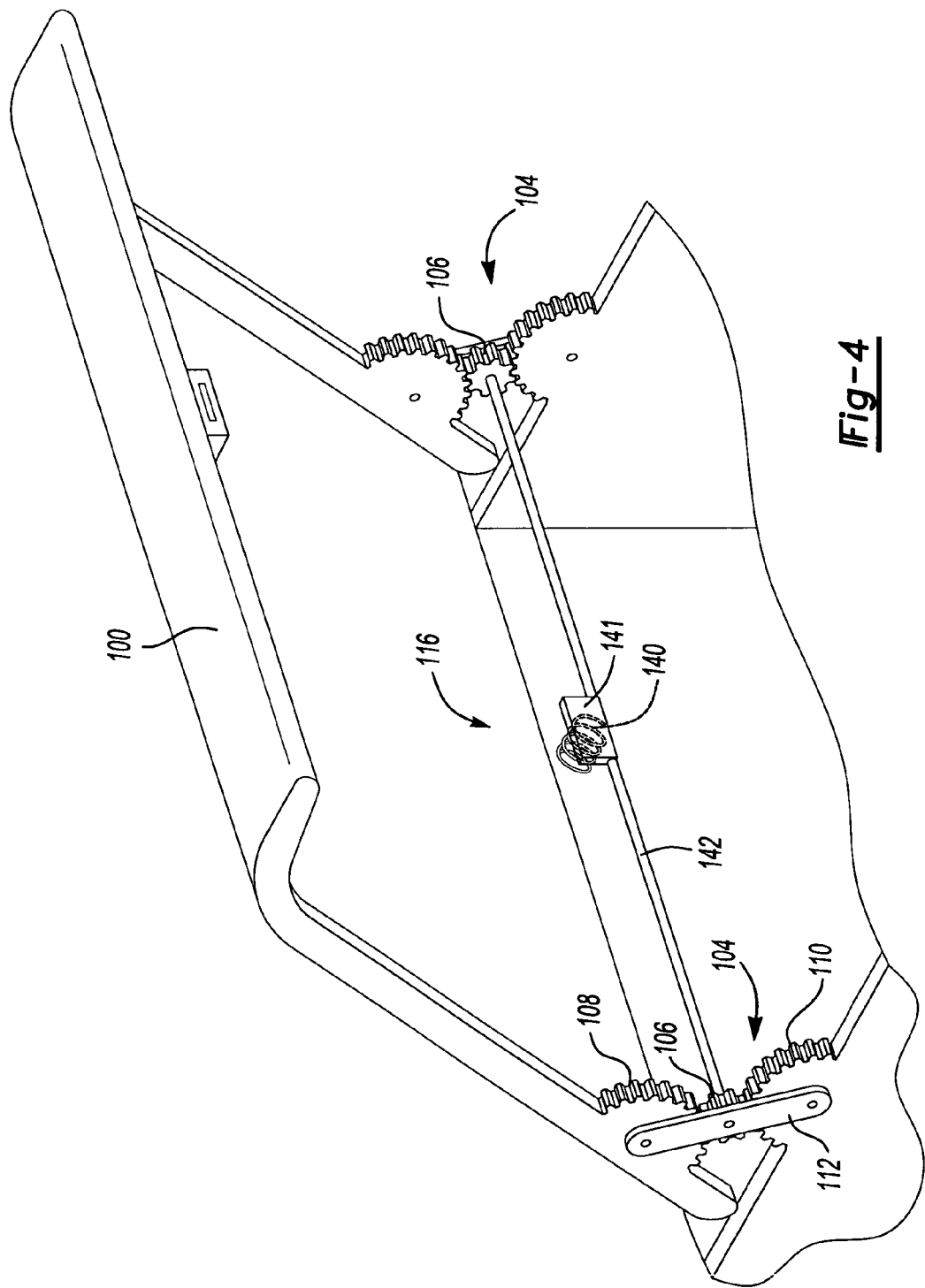
FIG. 4 is a view of the system of FIG. 1 when driven by a spring mechanism.

Another example of a drive mechanism 116 is shown schematically in FIG. 4. In this configuration, the drive mechanism 116 comprises a resilient mechanism 140 such as a coil spring or gas spring, for example. Here, the spring 140 will drive the sun gears 106 to rotate. It should be understood that drive mechanisms other than the coil springs, gas springs, and electric motors could also be used in conjunction with the planetary gear system 104 to move the decklid 100.

By using a planetary gear system 104 powered by a drive mechanism 116, the inventive system is able to drive the decklid 100 in a complex, non-circular motion similar to the two-dimensional, rotational and translational motion provided by four-bar linkages.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A system for moving a vehicle decklid relative to a vehicle body comprising:
  a planetary gear system having a sun gear, at least one planetary gear coupled to said sun gear, and a rotating link linking said sun gear and said at least one planetary gear together wherein said rotating link is rotatable about first and second link ends; and
  a drive mechanism that drives said planetary gear system such that a vehicle decklid is movable between an open position and a closed position.

2. The system of claim 1, wherein said at least one planetary gear comprises a first planetary gear adapted to be attached to the vehicle decklid and a second planetary gear adapted to be attached to the vehicle body.

3. The system of claim 2, wherein said first link end is coupled to said first planetary gear and said second link end is coupled to said second planetary gear.

4. The system of claim 3, wherein said rotating link is coupled to said sun gear at a position between said first and said second link ends.

5. The system of claim 1, wherein said at least one planetary gear is at least one sector gear.

6. The system of claim 5, wherein said at least one sector gear includes a gear body comprising a semi-circular shape.

7. The system of claim 1, wherein said drive mechanism includes an electric motor.

8. The system of claim 7, wherein said drive mechanism includes a controller that responds to a remote user signal.

9. The system of claim 1, wherein said rotating link is made of plastic.

10. A system for moving a vehicle decklid relative to a vehicle body comprising:
  a planetary gear system having a sun gear, at least one planetary gear coupled to said sun gear where said at least one planetary gear comprises a first planetary gear adapted to be attached to the vehicle decklid and a second planetary gear adapted to be attached to the vehicle body, and a rotating link linking said sun gear and said at least one planetary gear together wherein said rotating link is connected to a center of said first planetary gear, a center of said sun gear, and a center of said second planetary gear; and
  a drive mechanism that drives the planetary gear system to move the vehicle decklid between an open position and a closed position.

11. A system for moving a vehicle decklid relative to a vehicle body comprising:
  a planetary gear system having a sun gear, at least one planetary gear coupled to said sun gear where said at least one planetary gear comprises a first planetary gear adapted to be attached to the vehicle decklid and a second planetary gear adapted to be attached to the vehicle body, and a rotating link linking said sun gear and said at least one planetary gear together, wherein said rotating link has a first end fixed to a center of said first planetary gear and a second end fixed to a center of said second planetary gear and wherein said first end pivots about an axis defined by said center of said second planetary gear when the vehicle decklid is moved between the open and closed positions; and
  a drive mechanism that drives the planetary gear system to move the vehicle decklid between the open position and the closed position.

12. A system for moving a vehicle decklid relative to a vehicle body comprising:
  a planetary gear system having a sun gear, planetary gears coupled to said sun gear with one planetary gear adapted to be coupled to a vehicle decklid and with another planetary gear adapted to be coupled to a vehicle body, and a rotating link linking said sun gear and said planetary gears together; and
  a drive mechanism that drives said planetary gear system to move the vehicle decklid between an open position and a closed position wherein said drive mechanism includes a spring.

13. A vehicle decklid system that moves a vehicle decklid relative to a vehicle body, comprising:
  a planetary gear system having a sun gear, a first planetary gear that is fixable to a vehicle decklid, a second planetary gear that is fixable to a vehicle body, and a rotating link that links said sun gear, said first planetary gear, and said second planetary gear together; and a drive mechanism that drives said planetary gear system to move the vehicle decklid between an open position and a closed position.

14. The system of claim 13, wherein at least one of said first and second planetary gears is a sector gear.

15. The system of claim 13, wherein said drive mechanism includes a spring.

16. The system of clam 13, wherein said drive mechanism comprises an electric motor.

17. The system of claim 16, wherein said drive mechanism includes a controller that responds to a remote user signal.

18. The system of claim 13, wherein said drive mechanism can stop and hold the vehicle decklid at any position between the open and closed positions.

19. The system of claim 13, wherein said rotating link includes a first end, a second end, and a central portion interconnecting said first and second ends, and wherein said first end is fixed to a center of said first planetary gear, said second end is fixed to a center of said second planetary gear, and said central portion is fixed to a center of said sun gear.

20. The system of claim 19 wherein said first end of said rotating link pivots about an axis defined by said center of said second planetary gear.

* * * * *

UNITED STATES PATENT AND TRADEMARK OFFICE
CERTIFICATE OF CORRECTION

PATENT NO. : 7,267,390 B2 Page 1 of 1
APPLICATION NO. : 11/110391
DATED : September 11, 2007
INVENTOR(S) : Kuan et al.

It is certified that error appears in the above-identified patent and that said Letters Patent is hereby corrected as shown below:

Claim 11, Column 4, line 44: Delete "the"

Signed and Sealed this

Fourth Day of December, 2007

JON W. DUDAS
*Director of the United States Patent and Trademark Office*